United States Patent [19]

Chen

[11] Patent Number: 5,491,191

[45] Date of Patent: * Feb. 13, 1996

[54] STABLE CHLOROSULFONATED RESIN LATEX

[75] Inventor: John C. Chen, Hockessin, Del.

[73] Assignee: E. I. Du Pont de Nemours and Company, Wilmington, Del.

[*] Notice: The portion of the term of this patent subsequent to Apr. 7, 2009, has been disclaimed.

[21] Appl. No.: 866,764

[22] Filed: Apr. 7, 1992

Related U.S. Application Data

[63] Continuation-in-part of Ser. No. 864,118, Apr. 6, 1992, abandoned.

[51] Int. Cl.⁶ ............................................. C08L 9/00
[52] U.S. Cl. ......................... 524/576; 524/556; 524/560; 524/563; 524/572
[58] Field of Search ........................ 524/572, 576, 524/556, 560, 563

[56] References Cited

U.S. PATENT DOCUMENTS

| | | | |
|---|---|---|---|
| 3,632,671 | 1/1972 | Furukawa et al. | 260/876 |
| 4,981,730 | 1/1991 | Zaleski | 427/393.5 |
| 5,102,946 | 4/1992 | Chen et al. | 524/527 |

FOREIGN PATENT DOCUMENTS

| | | |
|---|---|---|
| 1720700 | 5/1990 | Germany . |
| 60-115679 | 6/1983 | Japan . |
| 59-166534 | 9/1984 | Japan . |
| 60-123516 | 7/1985 | Japan . |
| 1-44220 | 9/1989 | Japan . |
| 789055 | 1/1958 | United Kingdom . |

OTHER PUBLICATIONS

Derwent Abstract—Japanese Patent Application Kokai 59–049207, published Mar. 21, 1984.

*Primary Examiner*—Peter D. Mulcahy
*Attorney, Agent, or Firm*—Marilyn H. Bromels

[57] ABSTRACT

Self-stabilized resin latexes are provided which contain sulfonate salts produced by basic hydrolysis of chlorosulfonated $C_2$–$C_8$ alpha-olefin polymers having chlorine contents of 20–70 weight percent and sulfur contents of 1.5–10 weight percent. Further provided is a novel composition comprising a chlorosulfonated graft-modified ethylene/propylene copolymer.

6 Claims, No Drawings

STABLE CHLOROSULFONATED RESIN LATEX

RELATED APPLICATION

This application is a continuation-in-part of application Ser. No. 07/864,118, filed Apr. 6, 1992, now abandoned in the names of Edward Gus Brugel and John Chu Chen, AD-6056 entitled "Stable Chlorosulfonated Resin Latex".

BACKGROUND OF THE INVENTION

This invention relates to aqueous chlorosulfonated olefin copolymer latexes which are useful in the preparation of adhesives and coating compositions.

Chlorosulfonated olefin polymers have been used as binder resins in adhesive and coating compositions for many years because the presence of chlorine along the saturated polymer backbone imparts chemical resistance and outdoor weatherability to these products. Such compositions have therefore been especially suited for use in moisture resistant adhesives and marine and industrial coatings. Although the performance characteristics of these products has been excellent, the use of such compositions has declined over the years because they are solvent-based. Heightened concern regarding the environmental impact and health hazards associated with compositions of high volatile organic content (VOC) has led to a preference in the industry for aqueous latex coating and adhesive compositions.

Limited attempts have been made to develop aqueous chlorosulfonated resin latex compositions, the objective being to maintain chemical and moisture resistance while minimizing VOC, but such attempts have met with only limited success. The high surfactant level necessary to obtain stable latexes adversely affects adhesion and, in addition, moisture barrier properties of coatings derived from the latexes have also proved to be inadequate.

The present invention provides stable aqueous chlorosulfonated latex compositions which are self-stabilized as a result of their chemical structure. Therefore, the use of conventional surfactants is not required and the problems associated with the presence of large amounts of surfactants are eliminated.

SUMMARY OF THE INVENTION

More specifically this invention is directed to a stable chlorosulfonated resin latex composition comprising an aqueous suspension of a salt of a chlorosulfonated $C_2$–$C_8$ alpha-olefin polymer having a chlorine content of 20–70 weight percent and a sulfur content of 1.5–10 weight percent with the proviso that the latex is substantially free of surfactants. These compositions are particularly useful as binder resins in weatherable adhesive and coating compositions.

In addition, the invention is further directed to novel polymer compositions comprising chlorosulfonated graft-modified copolymers of ethylene and propylene containing 20–70 weight percent chlorine and 1.5–10 weight percent sulfur, the copolymers prior to chlorosulfonation containing about 0.5–10 weight percent grafted $C_3$–$C_{10}$ unsaturated acid or anhydride units. The sulfonate salts of such compositions form particularly stable latexes which are useful for preparation of adhesives and coatings.

DETAILED DESCRIPTION OF THE INVENTION

The latex compositions of the present invention contain a partially or completely neutralized salt of a chlorosulfonated $C_2$–$C_8$ alpha-olefin polymer. The high degree of polymer backbone chlorination contributes to the excellent chemical resistance and physical properties of films prepared from these copolymers, while the presence of a controlled amount of neutralized sulfonic acid groups, derived from hydrolysis of the sulfonyl chloride groups present in the chlorosulfonated polymer, is responsible for latex stability. As used herein the phrase stable latex means that the latex composition does not form a substantial amount of coagulum on standing within a period of two weeks at room temperature and, if any coagulum is formed, it is redispersible on gentle mixing. The acid salt groups promote latex stabilization because they function as protective colloids by enabling the development of stable interactions with the hydrated environment external to the latex particle.

The chlorosulfonated resin salts are sulfonates of chlorosulfonated $C_2$–$C_8$ alpha-olefin polymers and are formed by basic hydrolysis of the chlorosulfonated resins themselves. The term chlorosulfonated alpha-olefin polymer as used herein means those chlorosulfonated olefin polymers which contain chlorine in amounts ranging from 20–70 weight percent, and sulfur in amounts ranging from 1.5–10 weight percent, preferably 2.0–6.0 weight percent and which have average molecular weights of 1,000 to 300,000. The chlorosulfonated olefin polymers may be selected from the group consisting of chlorosulfonated homopolymers of $C_2$–$C_8$ alpha monoolefins and chlorosulfonated copolymers of $C_2$–$C_8$ alpha monoolefins and at least one ethylenically unsaturated monomer selected from the group consisting of $C_3$–$C_{10}$ alpha monoolefins, $C_1$–$C_{12}$ alkyl esters of unsaturated $C_3$–$C_{20}$ monocarboxylic acids, vinyl esters of saturated $C_2$–$C_{18}$ carboxylic acids, and carbon monoxide. In addition they may be graft polymers of chlorosulfonated $C_2$–$C_8$ alpha monoolefin polymers with unsaturated acids or anhydrides. Examples of such compositions include chlorosulfonated polyethylene, chlorosulfonated polypropylene, chlorosulfonated ethylene/vinyl acetate copolymers, chlorosulfonated ethylene/methyl acrylate copolymers, chlorosulfonated ethylene/methyl methacrylate copolymers, chlorosulfonated ethylene/n-butyl methacrylate copolymers, chlorosulfonated ethylene/glycidyl methacrylate copolymers, chlorosulfonated copolymers of ethylene with propylene, butene, 3-methyl-1-pentene, or octene, chlorosulfonated polyethylene maleic anhydride graft copolymers, chlorosulfonated polypropylene maleic acid graft copolymers, and chlorosulfonated polyethylene fumaric acid graft copolymers. Particularly preferred are chlorosulfonated polyethylene and chlorosulfonated polypropylene maleic anhydride graft copolymers.

A particularly effective class of chlorosulfonated polymers useful for preparing the latexes of the invention comprises chlorosulfonated ethylene propylene copolymers grafted with unsaturated acids or anhydrides of unsaturated dicarboxylic acids having sulfur contents of 1.5–10 weight percent and chlorine contents of 20–70 weight percent. The copolymers, prior to chlorosulfonation, are grafted with about 0.5–10 weight percent, preferably 2–6 weight percent unsaturated acids or anhydrides. The acid or anhydride grafting agents generally contain three to ten carbon atoms. Examples include maleic acid, maleic anhydride, fumaric acid, acrylic acid, methacrylic acid, itaconic acid, and citraconic acid. Maleic acid and maleic anhydride are particularly preferred because they provide compositions having outstanding adhesion. The copolymers preferably contain 2–10 weight percent ethylene prior to chlorosulfonation.

The chlorosulfonated alpha olefin polymers are generally prepared by reacting an alpha monoolefin polymer with a chlorosulfonating agent at a temperature of about 80°–120° C., usually in the presence of a free radical initiator and an inert solvent. A typical chlorosulfonating agent is sulfuryl chloride and a typical initiator is 2,2'-azobis(2-methylpropane nitrile). Various chlorosulfonated olefin polymers and methods for their preparation are discussed, for example, in U.S. Pat. Nos. 2,585,383, and 3,296,222. Neutralization of the acid groups to form the sulfonate salts is preferably effected during latex preparation.

The chlorosulfonated graft polymers are prepared in a similar manner. For example, chlorosulfonated maleated ethylene/propylene copolymers are prepared by dissolving the maleated copolymer in an inert solvent, for example, carbon tetrachloride, chloroform, chlorobenzene, or fluorobenzene, in an autoclave. The reaction mixture is heated to a temperature of about 100° C. to dissolve the polymer and chlorine, sulfuryl chloride and a free radical catalyst are fed to the reactor. After the addition of the catalyst and chlorosulfonating agents is complete the reactor is cooled and the polymer is isolated by precipitation.

The graft copolymers themselves are well-known compositions which are generally prepared by extrusion reaction of an ethylene, propylene, or ethylene/propylene copolymer with the unsaturated acid or anhydride in the presence of a free radical catalyst, for example, a peroxide such as dicumyl peroxide.

The sulfonic acid salt moieties produced by neutralization of the chlorosulfonated monoolefin polymers act as effective internal surfactants because they are homogeneously dispersed at the interface between the latex particle and the external aqueous environment. The number of sulfonyl chloride groups present in the chlorosulfonated polymer is therefore a controlling factor in stabilization of the latex compositions of the invention. If less than about 1.5 weight percent sulfur is present in the polymer, added surfactants are required in order to form stable latexes. In contrast, preparation of latexes derived from chlorosulfonated polymers containing above 10 weight percent sulfur is undesirable because the polymers lack stability. It is preferred to use chlorosulfonated polymers having sulfur contents of 2.0–6.0 weight percent because in some cases the polymeric sulfonate salts having sulfur contents greater than 6 weight percent become water-sensitive. In cases wherein the chlorosulfonated polymer contains other acidic groups or acid-generating functionalities, these groups will enhance the ability of the polymer to act as its own surfactant. For example, maleic anhydride groups present in chlorosulfonated polyethylene maleic anhydride graft copolymers are capable of being hydrolyzed and neutralized along with the sulfonyl chloride groups present in the copolymer.

The chlorosulfonated sulfonate salts suitable for use in the invention contain about 20–70 weight percent chlorine, preferably 25–60 weight percent chlorine. Chlorine levels within the range disclosed promote the formation and effectiveness of chain entanglement which contributes to film toughness and strength. In addition, this level of chlorine improves resistance to attack by acids and bases. Therefore, if the chlorine level is below about 20 weight percent the chemical resistance of films derived from the compositions will be compromised. Also, adhesives derived from the compositions would be soft and lack sufficient tensile strength to form strong films.

Neutralization of the chlorosulfonated alpha olefin polymers is effected by treatment with aqueous solutions of organic or inorganic bases. Typical bases which act as neutralizing agents include potassium hydroxide, sodium hydroxide, ammonium hydroxide, ammonia, diethanolamine, triethanolamine, triethylamine, and ethanolamine. Although it is preferable to add sufficient base to neutralize 50–100% of the acid groups present, for certain applications neutralization levels as low as 10% are adequate to produce a latex which is self-stabilizing.

The latexes of the invention are generally prepared by intimately mixing an organic solvent solution of the chlorosulfonated polymer and aqueous base under high shear mixing conditions, for example in a homomixer, a high-shear blender, or a combination of centrifugal pumps. The amount of aqueous base added is such that the solids content of the latex is from 5–75%, and the degree of neutralization of the polymer is at least 10%. Since the latex is self-stabilized it is not necessary to employ surfactants during latex preparation. That is, the latex is substantially free of surfactants and yet an emulsion is obtained which provides films having excellent adhesivity. However, small amounts of anionic or nonionic surfactants can be present in cases where it is desired to further reduce the particle size of the latex or to reduce the surface tension of the latex. Amounts of surfactant up to about 1% by weight of the chlorosulfonated resin salt are sufficient for this purpose. At this low level there is no adverse effect on adhesion. The resultant emulsion may be further refined by removal of the organic solvents, and such removal is preferred for the preparation of low VOC coatings and adhesives.

Conventional additives, such as fillers, thickeners, pigments, wetting agents, dispersing agents, antioxidants, curatives, and flame retardants may also be added to the stable aqueous latexes depending on the particular end-use which is desired.

The latexes are particularly suited for use in the preparation of marine paints, traffic paints, and adhesive primers.

The invention is further illustrated by the following embodiments wherein all parts are parts by weight unless otherwise specified.

EXAMPLES

Example 1

A stable latex composition containing an ammonium salt of chlorosulfonated polyethylene was prepared as follows. A mixture of 71 parts chlorosulfonated polyethylene (40% chlorine, 3% sulfur; prepared from polyethylene having a Brookfield viscosity 350 centipoise at 140° C.), 14 parts chlorosulfonated ethylene/vinyl acetate copolymer (55% chlorine; prepared from an ethylene/vinyl acetate copolymer containing 14% copolymerized vinyl acetate units, melt index 2500), and 15 parts Chlorowax 60–70® chlorosulfonated paraffin wax (60% Cl, viscosity 41 poise at 25° C.) was dissolved in sufficient toluene to make a 30% by weight solution. A 117.8g sample of the solution was homo-mixed with 96 ml of an aqueous solution of ammonia having a pH of approximately 10 in a Tekmar®homomixer. A stable, milk-like emulsion was achieved.

Example 2

A one liter glass autoclave was charged with 350 ml fluorobenzene and 50 g of a maleated ethylene/propylene resin containing 4% ethylene and 0.8% maleic anhydride, having a melt index of 250 g/10 minutes. The reaction mixture was then heated to 105° C. at a pressure of 35 psi to dissolve the ethylene/propylene resin. Over a period of 60 minutes 41.4 g of chlorine was fed to the reactor. Also during this period 40 ml of a mixture of 25 ml sulfuryl chloride, 0.5 g VAZO 64 initiator 2,2'-azo-bis(2-methylpropane nitrile) and 15 ml flurorobenzene were fed to the reactor. The temperature was allowed to fall to 75° C. by the end of the addition of the sulfuryl chloride solution. The temperature was then increased to 100° C., the chlorine gas flow was stopped and the reactor was cooled to less than 50° C. and the pressure was released. The polymer was isolated by precipitation into methanol using a high speed blender. It was washed several times with methanol and dried overnight in a vacuum oven at 40° C. The chlorosulfonated maleated ethylene/propylene resin contained 32.6% chlorine and 2.72% sulfur by weight.

A stable latex composition was prepared as follows from the chlorosulfonated maleated ethylene/propylene resin. A 5 g sample of the resin was dissolved in 15 g butyl acetate. To this mixture was added 500 ml distilled water containing 1.0 g of triethylamine and 10 g of Dowanol®PMA coalescing agent (propylene glycol methyl ether acetate) and homogenized for 3 minutes using a Lamb®homomixer. The resulting emulsion was stable for over a month at room temperature.

As a comparison a latex composition, Comparative Sample 1A, was prepared from a similar polymer which contained no chlorosulfonyl groups. A 5 g sample of chlorinated, maleated ethylene/propylene resin (chlorine content 26%; prepared from a maleated ethylene/propylene resin containing 4%ethylene, 0.8% maleic anhydride, and having a melt index of 250 g/10 minutes) was dissolved in 15 g butyl acetate. The mixture was added to 500 ml distilled water containing 1.5 g of Merpol A®nonionic surfactant, 1.0 g triethylamine and 10 g Dowanol®PMA propylene glycol methyl ether acetate. The mixture was homogenized for three minutes using a Lamb®homomixer. The resultant emulsion quickly coagulated at room temperature.

Example 3

A stable chlorosulfonated latex composition is prepared from a chlorosulfonated polypropylene (chlorine content of 30.5%, sulfur content 2.4%; prepared from polypropylene having a melt index of 25 g/10 minutes). A 5 g sample of the polymer is dissolved in 15 g toluene. The mixture is added to 500 ml distilled water containing 1.0 g of triethylamine and 10 g of Dowanol®PMA coalescing agent (propylene glycol methyl ether acetate) and homogenized for 3 minutes using a Lamb®homomixer.

Example 4

A stable chlorinated latex composition is prepared from a chlorosulfonated polyethylene (chlorine content 28%; sulfur content 2.0%; prepared from polyethylene having a melt index of 100 g/10 minutes). A 5 g sample of the polymer is dissolved in 15 g toluene. The mixture is added to 500 ml distilled water containing 1.0 g of triethylamine and 10 g of Dowanol®PMA coalescing agent (propylene glycol methyl ether acetate) and homogenized for 3 minutes using a Lamb®homomixer.

We claim:

1. A self-stabilized chlorosulfonated resin latex composition comprising an aqueous emulsion of a salt of a chlorosulfonated $C_2$–$C_8$ alpha-olefin homopolymer, said chlorosulfonated homopolymer having a chlorine content of 20–70 weight percent and a sulfur content of 1.5–10 weight percent with the proviso that the latex is substantially free of surfactants.

2. The composition of claim 1 wherein the sulfur content is 2–6 weight percent.

3. The composition of claim 1 wherein the chlorosulfonated alpha-olefin polymer is chlorosulfonated polyethylene.

4. A self-stabilized chlorosulfonated resin latex composition comprising an aqueous emulsion of a salt of a chlorosulfonated copolymer of a $C_2$–$C_8$ alpha-olefin and at least one other ethylenically unsaturated monomer selected from the group consisting of $C_3$–$C_{10}$ alpha monoolefins and carbon monoxide, said chlorosulfonated copolymer having a chlorine content of 20–70 weight percent and a sulfur content of 1.5–10 weight percent, with the proviso that the latex is substantially free of surfactants.

5. The composition of claim 4 wherein the sulfur content of the chlorosulfonated copolymer is 2–6 weight percent.

6. The composition of claim 4 wherein the chlorosulfonated copolymer is a chlorosulfonated copolymer of ethylene and a $C_3$–$C_8$ alpha monoolefin.

* * * * *